United States Patent [19]
Walowit et al.

[11] Patent Number: 6,020,583
[45] Date of Patent: Feb. 1, 2000

[54] COLOR SENSOR

[75] Inventors: Eric Walowit, Springboro; Ronald J. Duke, Centerville; Victor L. Iseli, Cincinnati; Long B. Sam, West Chester; Michael J. Vrhel, Lebanon, all of Ohio

[73] Assignee: Color Savvy Systems Limited, Springboro, Ohio

[21] Appl. No.: 09/059,955

[22] Filed: Apr. 14, 1998

Related U.S. Application Data

[62] Division of application No. 08/923,705, Sep. 4, 1997
[60] Provisional application No. 60/025,911, Sep. 12, 1996.

[51] Int. Cl.[7] .................................................. G01J 3/50
[52] U.S. Cl. ........................................ 250/226; 356/425
[58] Field of Search .............................. 250/226, 559.14; 356/406, 407, 425, 411

[56] References Cited

U.S. PATENT DOCUMENTS

| | | | |
|---|---|---|---|
| 2,519,081 | 8/1950 | Skarstrom | 250/218 |
| 3,226,195 | 12/1965 | Nichols et al. | 23/230 |

(List continued on next page.)

OTHER PUBLICATIONS

In–Line Measurement and Closed–loop Control of the Color of Breakfast Cereals, by Ian McFarlane et al., The American Association of Cereal Chemists, Inc., Dec. 1988, vol. 33, No. 12, pp. 978–980.

On–Line Color Measurement, by Ian McFarlane et al., The American Association of Cereal Chemists, Inc., Jun. 1985, vol. 30, No. 6, pp. 386–388.

The Amateur Scientist—When Hazy Skies Are Rising, by Shawn Carlson, Scientific American, May 1997, pp. 106–107.

Experience with automatic control of biscuit and cracker oven, by Ian McFarlane, Automatic Control of Food and Biological Processes, 1994 Elsevier Science B.V., pp. 345–350, Jan. 1994.

Hunter Introduces Qual–Probe™ XR, Hunter's Lab Reflections & Transmissions, Feb. 1996, No. 61, pp. 1–6.

An Automatic Digital Colorimeter for Laboratory and Process Control Applications, by John W. Ward, Feb. 1966, pp. 1–11.

(List continued on next page.)

*Primary Examiner*—Que T. Le
*Attorney, Agent, or Firm*—Thompson Hine & Flory LLP

[57] ABSTRACT

A sensor for measuring reflective, transmissive, or self-luminous samples, comprises a plurality of light sources, where each of the light sources emit light of a substantially different wavelength band spaced in the visible spectrum; a reference channel photodetector; a sample channel photodetector; an optical cap adapted to direct a first portion of the light emitted by each of the light sources to the reference channel photodetector; a reflector cone for directing a second portion of the light emitted by each of the light sources to the sample; and a receptor piece for directing the diffuse portion of the light reflected from the sample to the sample channel photodetector. Preferably, the reference channel and sample channel photodetectors are identical devices and are mounted back-to-back to share environmental characteristics, and in turn, minimize the variation between their respective responses. The sensor is preferably incorporated into a hand-held "mouse" device, which includes an area on its top surface for seating an index finger of the human hand. Positioned within this area is a pressure-activated switch that is operatively coupled to the sensor circuitry for performing the various readings. And the sensor is preferably mounted into the mouse device such that the focal aperture of the downward pointing reflector cone is in axial alignment with the pressure-activated switch. Accordingly, a user will be able to use the mouse to "point" with his or her index finger to an area of the sample surface, and will then simply press the switch using the same index finger.

11 Claims, 11 Drawing Sheets

U.S. PATENT DOCUMENTS

| | | | |
|---|---|---|---|
| 3,544,789 | 12/1970 | Wieder | 250/43 |
| 3,656,856 | 4/1972 | Katz et al. | 356/206 |
| 3,773,424 | 11/1973 | Selgin | 356/181 |
| 3,783,276 | 1/1974 | Allington | 250/226 |
| 3,916,168 | 10/1975 | McCarty et al. | 235/151 |
| 3,935,436 | 1/1976 | Holschlag et al. | 235/151 |
| 3,994,590 | 11/1976 | DiMartini et al. | 356/178 |
| 4,108,555 | 8/1978 | Helder et al. | 356/184 |
| 4,123,172 | 10/1978 | French | 356/188 |
| 4,244,655 | 1/1981 | Asai et al. | 356/404 |
| 4,273,449 | 6/1981 | Schmid | 356/411 |
| 4,283,142 | 8/1981 | DeSteur et al. | 356/319 |
| 4,455,084 | 6/1984 | Webb, Jr. et al. | 356/72 |
| 4,479,718 | 10/1984 | Alman | 356/405 |
| 4,542,296 | 9/1985 | Kleinnibbelink et al. | 250/359 |
| 4,565,450 | 1/1986 | Wirz et al. | 356/402 |
| 4,617,277 | 10/1986 | Bohl | 436/34 |
| 4,678,338 | 7/1987 | Kitta et al. | 356/402 |
| 4,783,591 | 11/1988 | Sullivan | 250/227 |
| 4,785,170 | 11/1988 | Witt | 260/226 |
| 4,810,873 | 3/1989 | Ammann et al. | 250/227 |
| 4,878,756 | 11/1989 | Stauffer | 356/406 |
| 4,881,811 | 11/1989 | O'Brein | 356/323 |
| 4,917,500 | 4/1990 | Lugos | 356/406 |
| 4,937,441 | 6/1990 | Ishizawa et al. | 250/205 |
| 4,940,889 | 7/1990 | Ono et al. | 250/214 |
| 4,949,400 | 8/1990 | Leveen et al. | 356/420 |
| 4,987,298 | 1/1991 | Inagaki | 250/214 |
| 5,008,525 | 4/1991 | Petronio | 250/214 |
| 5,015,839 | 5/1991 | Tanikoshi | 250/214 |
| 5,019,704 | 5/1991 | Zimmermann et al. | 250/214 |
| 5,021,645 | 6/1991 | Satula et al. | 250/223 |
| 5,029,277 | 7/1991 | Kane | 250/214 |
| 5,039,191 | 8/1991 | Myszka | 385/31 |
| 5,055,267 | 10/1991 | Burroughs et al. | 422/83 |
| 5,125,747 | 6/1992 | Sayegh et al. | 356/407 |
| 5,137,364 | 8/1992 | McCarthy | 356/402 |
| 5,150,174 | 9/1992 | Ryczek et al. | 356/402 |
| 5,168,320 | 12/1992 | Lutz et al. | 356/73 |
| 5,179,423 | 1/1993 | Kravetz et al. | 356/328 |
| 5,233,408 | 8/1993 | Satula | 356/402 |
| 5,257,097 | 10/1993 | Pineau et al. | 358/500 |
| 5,272,518 | 12/1993 | Vincent | 356/405 |
| 5,336,900 | 8/1994 | Peters et al. | 250/561 |
| 5,377,000 | 12/1994 | Berends | 356/73 |
| 5,416,890 | 5/1995 | Beretta | 395/131 |
| 5,471,052 | 11/1995 | Ryczek | 250/226 |
| 5,537,211 | 7/1996 | Dial | 356/402 |
| 5,542,421 | 8/1996 | Erdman | 128/633 |
| 5,558,033 | 9/1996 | Futamura | 112/475 |

OTHER PUBLICATIONS

Photoelectric Tristimulus Colimetry with Three Filters, by Richard S. Hunter, Jul. 1942, pp. 1–46.

A Continuous Color Monitor for the Textile Dye Range, by John W. Ward, American Dyestuff Reporter, Sep. 1968, pp. 107–113.

A New Recording Spectrophotometer, by Arthur C. Hardy, J.O.S.A., vol. 25, Sep. 1935, pp. 305–311.

Instrumental Shade–Sorting to Visual Acceptance Limits, by John W. Ward, 1968 AATCC International Technical Conference, Oct. 1968, pp. 1–16.

Spectrophotometry, by Kasson S. Gibson, National Bureau of Standards Circular 484, Sep. 1949, pp. 1–48.

COLOR SENSOR

CROSS REFERENCE TO RELATED APPLICATIONS

This is a divisional of application Ser. No. 08/923,705, filed Sep. 4, 1997.

This application claims priority under 35 U.S.C. §119 from Provisional Application Ser. No. 60/025,911, filed Sep. 12, 1996.

BACKGROUND

The present invention relates generally to devices for measuring reflective, transmissive, or self-luminous samples and reporting their spectrophotometric, spectroradiometric, densitometric, or other colorimetric appearance attributes.

Users of desktop color systems have a need to accurately measure color. Color systems end-users expect accurate color matching between their source (scanner or monitor) and the color hardcopy produced by their color digital printer. In order to achieve WYSIWYG ("What You See Is What You Get") color, color imaging devices must be characterized and calibrated transparently to the user, and work seamlessly with popular software applications. Support for import and export of image data described in a device independent format such as CIE is increasingly a requirement.

The inputting of colors represented by physical samples into an electronic design for display and printing is currently a tedious process. The end-user has several options. The sample may be scanned, but the color reproduction will be poor for the reasons discussed above. The sample may be visually matched by specifying RGB or CMYK amounts for the application, but the match will be device dependent and highly variable. A color specification system may be employed by visually matching the sample to one of the specified colors then entering the color specification to the application, but the match will be device dependent, highly variable, and rely upon application compatibility with the color specification system.

One application where WYSIWYG is particularly important is color desktop publishing. In many desktop and workstation environments, color end-users (e.g. publishing, prepress, design, graphics, etc.) have a wide selection of input and output devices (e.g. scanners, monitors, printers, imagesetters, etc.) and color creation applications. Since this environment is generally open-architecture, the calorimetric characteristics of the various devices and applications are not, and cannot be, well-matched due to the multi-vendor nature of the market. As a result, the quality of color reproduction between input and output is highly variable and generally poor. In order to achieve consistent color matching in this highly disparate environment, several companies have introduced software-based color management system (CMS) technology based on device independent color. The principle of operation of such systems is to reference all devices (device dependent) to a common CIE color space (device independent). A simple work flow for such a CMS might be comprised of the following steps: (1) the image scan (Scanner RGB) is referenced to CIE; (2) the image is converted to Display RGB for editing; (3) the displayed image is referenced back to CIE; and (4) the image is converted to printer CMYK for output.

Generally, the CMS vendor provides several key elements: a library of device characterization profiles, a color matching method, and color transformation software. Since the expertise and equipment required for the creation of profiles is expensive, device characterization is performed by the CMS vendor for an average device for average viewing conditions. Unfortunately, characterization accomplished in this manner is done under factory conditions and not for the end-user conditions (device, light source, media, viewing, etc.). Since an end-user's device will be quite different from the device that was profiled at the factory, some vendors offer hardware/software calibration. Calibration only partially compensates for the differences between factory conditions and end-user conditions but does not satisfy the need for end-user device characterization compatible with open architecture CMS. However, there are no end-user characterizors for ambient, display, or hardcopy characterization due to the high cost of such equipment and lack of suitable end-user software. Currently, CMS products are generally proprietary and must be purchased from the CMS vendor. As open architecture CMS technology will be included as part of the operating system, device manufacturers, third parties, and end-users will require custom CMMs or profiles.

The combination of CMS technology, factory characterization, and end-user calibration improves the average color reproduction on the desktop somewhat, but is expensive, complex, and does not meet the end-user requirements for quality, cost, speed, and compatibility. End-users need a fast, low-cost, simple hardware/software characterizor enabling them to easily characterize (not just calibrate) their specific scanners, monitors, and printers to their specific viewing conditions in a manner that is compatible with open architecture CMS technology.

U.S. Pat. No. 5,137,364 discloses a color sensor that employs a plurality of LEDs (light emitting diodes) and an array of photodetectors. The McCarthy sensor utilizes individually addressable, customized LEDs as its illumination sources and a photodetector array, where each photodetector measures reflectance of the sample at a different visible wavelength, and where each element's spectral sensitivity must be individually optimized. The McCarthy sensor also utilizes a single beam reflectance measurement scheme. Thus, the photodetectors must be made as stable as possible by maintaining at a constant temperature and being protected from humidity, etc. Furthermore, the McCarthy device requires expensive and stable components since the measured energy collected from the color sample must be constant. Such expensive and customized components nevertheless may also experience long term drift and may be highly sensitive to noise.

U.S. Pat. No. 5,377,000 to Berends discloses a color sensor that utilizes a single illumination source positioned directly above the sample, 21 sample photodetectors arranged circumferentially around the illumination source and positioned at 45° angles with respect to the sample, and 2 reference photodetectors positioned to receive light directed from the single illumination source. Berends utilizes a "pseudo-dual beam" reflectance measurement scheme in an attempt to eliminate the need of an additional 19 reference photodetectors that would be required in a classic dual-beam reflectance measurement scheme. This is performed by configuring the 2 reference photodetectors to sample the illumination source at opposite extremes of the visible light spectrum, and by applying a "least squares fit" calibration calculation to simulate the required 21 reference channel readings.

SUMMARY

The present invention provides an extremely accurate color sensor, designed to utilize a classic dual-beam reflectance measurement scheme with inexpensive and commercially available components.

In accordance with one aspect of the present invention, a device for measuring reflective, transmissive, or self-luminous samples, comprises: a plurality of light sources, which are preferably light emitting diodes (LEDs), where each of the light sources emit light of a substantially different wavelength band spaced in the visible spectrum; a reference channel photodetector; a sample channel photodetector; an optical cap adapted to direct a first portion of the light emitted by each of the light sources to the reference channel photodetector; a reflector cone for directing a second portion of the light emitted by each of the light sources to the sample; and a receptor piece for directing the diffuse portion of the light reflected from the sample to the sample channel photodetector.

In a preferred embodiment of the invention, the reference channel and sample channel photodetectors are identical devices and are mounted back-to-back to share environmental characteristics, and in turn, minimize the variation between their respective responses. The output signals from the photodetectors are processed to provide at least one appearance value, e.g., spectrophotometric, spectroradiometric, densitometric, and other colorimetric appearance attributes for the samples.

Preferably, the optical cap has a non-absorbing interior integrating surface and is mounted over the LEDs and the reference photodetector such that the reference portion of light generated by the emitters reflects off of the integrating surface to the reference photodetector. The LEDs are each preferably mounted such that a portion of each LED extends into a cylindrical cavity pointing downwards towards the sample, the cavities acting to collimate the sample portion of light emitted by the LEDs. The reflector cone preferably has a conical reflecting surface, positioned in alignment with the cavities, and angled 22.5° with respect to the cavities' axes, such that the sample portion of light directed downward towards the conical reflecting surface will first reflect off of the conical reflecting surface and then be directed towards the sample at an angle of 45°. Therefore, the sample photodetector, positioned directly over the sample and behind an aperture in the receptor piece, will receive the diffuse component of the light reflected from the sample.

The device may further comprise means for supplying current to the LED wherein the LED current provided by the current supplying means is programmed such that assumed incident light which is proportional to the LED current is a known measurement.

The invention also provides a method of measuring color samples using a color measurement device, the method comprising: (a) activating at least one light source of a certain wavelength band, (b) directing a first portion of the light emitted by the light source to a reference photodetector, (c) directing a second portion of the light emitted by the light source to the sample surface, (d) directing light reflected from the sample surface to a sample photodetector, (e) calculating a reflectance for the light source based upon output readings of the sample photodetector in step (d) and output readings of the reference photodetector in step (b), and (f) repeating steps (a) through (e) for several light sources, each emitting light of substantially different wavelength bands.

The method, in a preferred embodiment, also includes the steps of (f) obtaining a reading from the sample photodetector when none of the light sources are illuminated and (g) obtaining a reading from the reference photodetector when none of the light sources are illuminated, where step (e) involves the step of calculating a reflectance for the light source based upon a ratio of the difference of output readings of the sample photodetector in step (d) and output readings of the sample photodetector in step (f) versus a difference of output readings of the reference photodetector in step (b) and output readings of the reference photodetector in step (g). And the method, in the preferred embodiment further includes the steps of (h) activating the light source of step (a), (i) directing a first portion of light emitted by the light source to a reference photodetector, (j) directing a second portion of the light emitted by the light source to a substantially non-reflecting calibration surface, (k) calculating a "black" calibration reflectance reading for the light source based upon the sample photodetector reading from step (j) and the reference photodetector reading from step (i), (l) again activating the light source of step (a), (m) directing a first portion of light emitted from the light source to the reference photodetector, (n) directing a second portion of light emitted from the light source to a substantially white calibration surface, (o) calculating a "white" calibration reflectance reading for the light source based upon the sample photodetector reading from step (n) and the reference photodetector reading from step (m), and (p) calculating a normalized and bias corrected reflectance for the light source using the reflectance calculated in step (e), the "black" calibration reflectance calculated in step (k) and the "white" calibration reflectance calculated in step (o).

In another embodiment, step (e) includes the step of accounting for the sensitivity of the reference photodetector and the spectral power distribution of the light source. In yet another embodiment, the method further comprises the step of profiling the characteristics of the reference photodetector and the light source by performing steps (a) through (f) on at least two samples having known reflectances. And in yet another embodiment, the method further comprises the step of transforming the reflectance calculated in step (e) into a CIE XYZ tristimulus value for the sample, where the transformation accounts for the sensitivity of the human visual system.

Accordingly, a preferred embodiment of the present invention provides a color sensor which utilizes the "dual beam" reflectance sensing scheme by incorporating a reference photodetector. Because both the sample photodetector and the reference photodetector share common optical, electrical, environmental and mechanical characteristics, the present invention can utilize low price components which may tend to exhibit drift. Further, because the sample and reference channels are ratioed in calculating the reflectance, this drift will be canceled out, thereby yielding ultra-high performance at very low cost. The present invention has also been designed to, and physically configured to, allow the measurement of reflected light from an area of 3 millimeters in diameter using illumination with 45° incidence and 0° detection angle. The sensor is highly rugged, having no moving parts, and through the application of the dual optical paths, is extremely reliable and inexpensive. Off-the-shelf photodetectors with integrated amplifiers reduce dark errors, noise, cost and allow for accurate gain tracking over their operational temperature range. The design also accommodates an interchangeable selection of LEDs, allowing the latest, most efficient and least costly commercially available LEDs to be used.

The present invention is also designed to be easily assembled and can be integrated into a main circuit board to further reduce assembly costs. Furthermore, optical and beam-directing components of the present invention can also be integrated directly as part of an outer hand-held enclosure (i.e., hand-held mouse), further increasing the system integration, and therefore, further reducing the end user price. Because temperature stabilization and compensation is no longer required, LED reliability is enhanced. Since the heat producing LEDs are now isolated from the thermally sensitive photodiodes, there is also a reduced opportunity for adverse thermal shock. Furthermore, the present invention reduces the consumed power and reduces measurement overhead. Thus, the invention is specially designed to be inexpensively mass-produced, without sacrificing accuracy or reliability.

As indicated above, one aspect of the present invention incorporates the color sensor into a hand-held "mouse" device. The mouse device includes an area on its top surface for seating an index finger of the human hand. Positioned within this area is a pressure-activated switch that is operatively coupled to the circuitry for performing the colorimetric and reflectance readings. Preferably, the sensor is mounted into the mouse device such that the focal aperture of the downward pointing reflector cone is in axial alignment with the pressure-activated switch. Accordingly, a user will be able to use the mouse to "point" with his or her index finger to an area of the sample surface, and will then simply press the switch using the same index finger.

Other foreseeable applications for the color sensor of the present invention include high-speed color-inspection/control in a manufacturing or production environment, analogous to the uses described in U.S. Pat. No. 5,021,645 to Satula et al.; or color matching of cosmetics or clothing accessories to a skin-color or foundation make-up color of a customer, analogous to the uses described in U.S. Pat. No. 5,537,211 to Dial.

DETAILED DESCRIPTION

Figure 1:
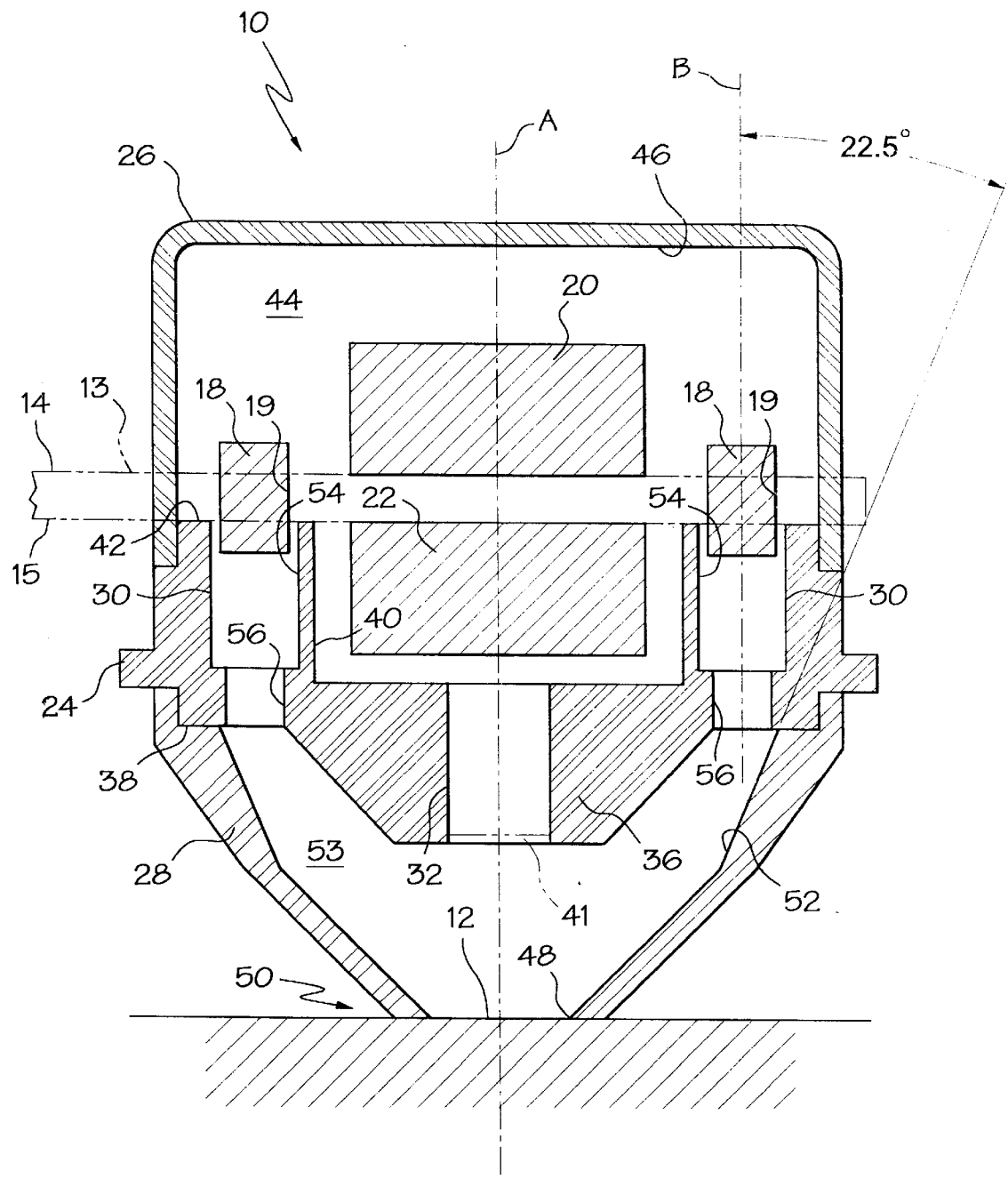
FIG. 1 is a cross-sectional, elevational view of an embodiment of the color sensor of the present invention.

As shown in FIG. 1, the color sensor 10 for sampling the color of a sample surface 12 comprises a printed circuit board 13; a plurality of light sources, such as light emitting diodes (LEDs) 18 mounted in apertures 19 extending through the circuit board 13, each of the LEDs emitting light of a substantially different wavelength band spaced in the visible spectrum; a reference photodetector 20 mounted to the top surface 14 of the printed circuit board; a sample photodetector 22 mounted to the bottom surface 15 of the printed circuit board, substantially back-to-back with the reference photodetector 20; an annular collar 24 mounted to the bottom surface 15 of the printed circuit board; an optical cap 26 mounted to the top surface 14 of the printed circuit board; and a reflector cone 28 mounted onto the collar 24.

Figure 2:
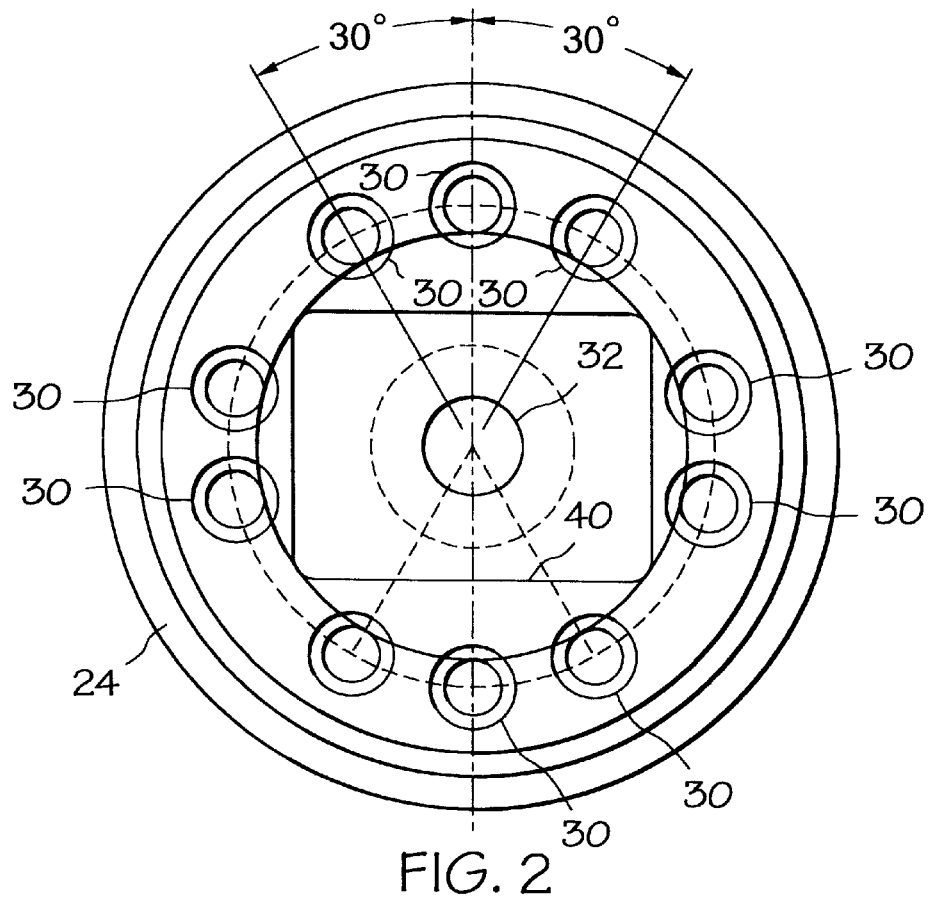
FIG. 2 is a top view of the annular collar component of the color sensor.
Figure 3:
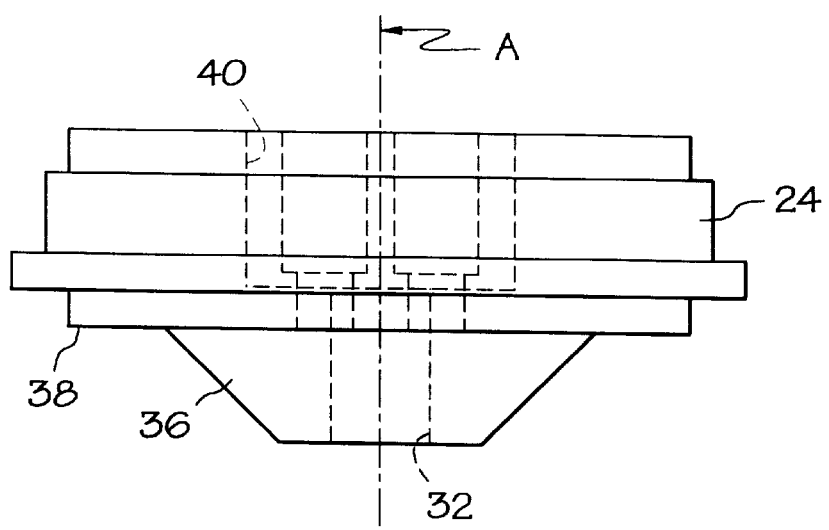
FIG. 3 is a side view of the annular collar component of the color sensor.

As shown in FIGS. 1, 2, and 3, the collar 24 is an annular component having a plurality of emitter apertures 30 bored through the collar in an axial direction, and circumferentially spaced around a receiver aperture 32 that is axially bored through a frustoconical receptor piece 36. The receptor piece 36 extends and points downward from the bottom surface 38 of the collar 24 along axis A. A rectangular cavity 40 for housing the sample photodetector 22 extends into the collar 24 from the top surface 42 of the collar, substantially at axis A, and is in direct optical communication with the receiver aperture 32, such that light waves reflected into the receiver aperture 32 of the receptor piece 36 can contact the sample photodetector 22.

Those skilled in the art will appreciate that the same cavity 40 for housing the sample photodetector 22 can also be used to mount an optional optical filter 41 constructed of flat glass or plastic. Such a filter 41, mounted at the bottom of the cavity 40, at the opening of the receiver aperture 32, and aligned with axis A, could serve the purpose of excluding any unwanted light, e.g., infrared light in the case of a sensor optimized for the visible spectrum. Accordingly, the filter 41 could be an infrared filter or any other band-pass filter as necessitated by the envisioned use of the sensor 10. The filter 41 will also protect the face of the sample photodetector. It is also within the scope of the invention to provide a similar optical filter over the reference photodetector 20 to band-pass filter the light reflected thereto.

As shown in FIG. 1, the plurality of LEDs 18 are preferably mounted into apertures 19 of the printed circuit board 13 such that a light emitting portion of each LED extends into a corresponding one of the emitter apertures 30. The optical cap is mounted to the printed circuit board 13 such that the cap forms an enclosed cavity 44 over the entire array of LEDs 18. Each of the plurality of LEDs are also mounted on the printed circuit board 13 such that a portion of the light emitted by the LED is emitted or reflected backwards (upwardly) into the cavity 44 formed by the optical cap 26. The reference photodetector 20 is centrally mounted with respect to the array of LEDs 18 to the top surface 14 of the printed circuit board, within the cavity 44.

The inner surface 46 of the optical cap is preferably coated with an opaque, substantially non-absorbing, integrating coating such as a flat white paint. Therefore, light waves emitted from the LEDs through the top surface 14 of the printed circuit board, and into the cavity 44, are transmitted to the integrating surface 46 and are directly or indirectly reflected from the integrating surface to the reference photodetector 20.

The reflector cone 28 is attached to the bottom 38 of the collar and has an aperture 48 through the tip 50 of the reflector cone. The aperture 48 is in axial alignment with the axis A of the collar 24, and in turn, is in alignment with the receiver aperture 32 of the collar. The reflector cone 28 has a substantially frustoconical inner surface which forms a cavity 53 between the collar 24 and the reflector cone 28. The reflector cone 28 also has an conical reflector surface 52, preferably coated with a chrome plating (or any other suitable reflective coating), in alignment with each of the axes B of the emitter apertures 30, and which is angled, with respect to the axes B, inwardly towards the axis A, at an angle that is approximately 22.5°. Therefore, the light emitted through the emitter apertures 30 and reflected from the conical reflective surface 52 will contact the aperture 48 of the reflector cone, and in turn the sample surface 12, substantially at an angle of 45° with respect to the flat tip 50 of the reflector cone (or with respect to the sample surface 12, if applied to a sample). Thus, the diffuse component of the reflected light waves will be transmitted upwardly from the sample along axis A, through the receiver aperture 32 to the sample photodetector 22.

Accordingly, when one of the LEDs is activated, and when the flat tip 50 of the reflector cone is abutting a sample surface 12, the reference photodetector 20 will sample light waves emitted from the portion of the LED 18 extending through the top surface 14 of the printed circuit board and reflected from the optical cap's inner surface 46, and the sample photodetector 22 will sample the diffuse component of the light waves emitted from the portion of the same LED 18 extending through the bottom surface 15 of the printed circuit board and reflected off the sample surface 12. The use of the 45°/0° geometry of the present invention corresponds more closely with the visual viewing of samples and excludes the specular component of reflectance. The spectral reflectance of the color sample can thus be calculated for this particular LED (or combination of LEDs) from the readings of the reference photodetector 20 and the sample photodetector 22 using a dual beam method as is described in detail below.

Figure 16:
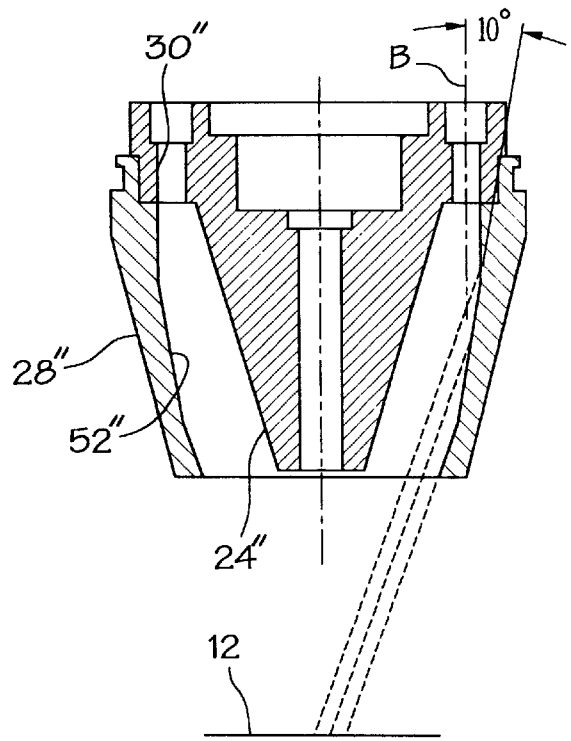
FIG. 16 is a cross-sectional, elevational view of another alternate embodiment of the collar and reflector cone components of the present invention.
Figure 17:
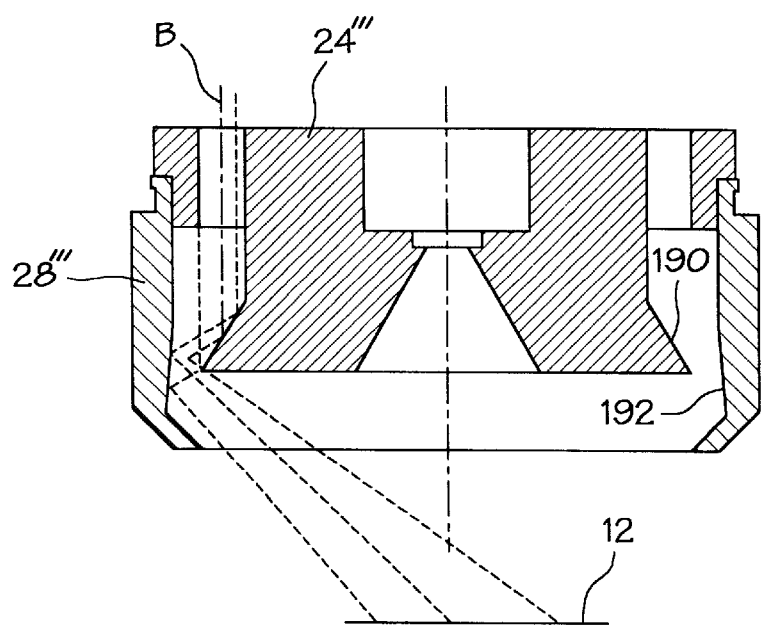
FIG. 17 is a cross-sectional, elevational view of another alternate embodiment of the collar and reflector cone components of the present invention.

When using the 45°/0° geometry, the operable range for the angle of the conical reflector surface is 20.5° to 24.5°, while the preferred range is 22.4° to 22.6°. Thus, those skilled in the art will appreciate that it is within the scope of the present invention that the angle of the conical reflector surface be within the above ranges for the 45°/0° geometry. It will also be appreciated to those of ordinary skill in the art that angle A can be altered to obtain optical geometries that are better suited for particular uses. For example, when using the present invention to detect characteristics of a patient's skin (such as skin color), a 20°/0° geometry as shown in FIG. 16 or modified-diffuse/0° geometry as shown in FIG. 17 may be preferred. These alternate embodiments are better suited for remote color sensing of a sample surface and will be discussed in greater detail below.

Referring again to the embodiment shown in FIG. 1, each emitter aperture 30 is preferably formed with an upper cylindrical channel 54 and a lower cylindrical channel 56. The lower cylindrical channel is concentrically aligned with the upper cylindrical channel 54 along the axis B of the emitter aperture and has a smaller diameter than the upper cylindrical channel 54. The lower cylindrical channel thus acts to collimate the light waves emitted through the emitter aperture 30, to the conical reflective surface 52, and onto the sample surface 12. Additionally, although shown as having the same size, the emitter apertures 30 can vary in size to allow for maximum flexibility in LED selection.

Figure 6:
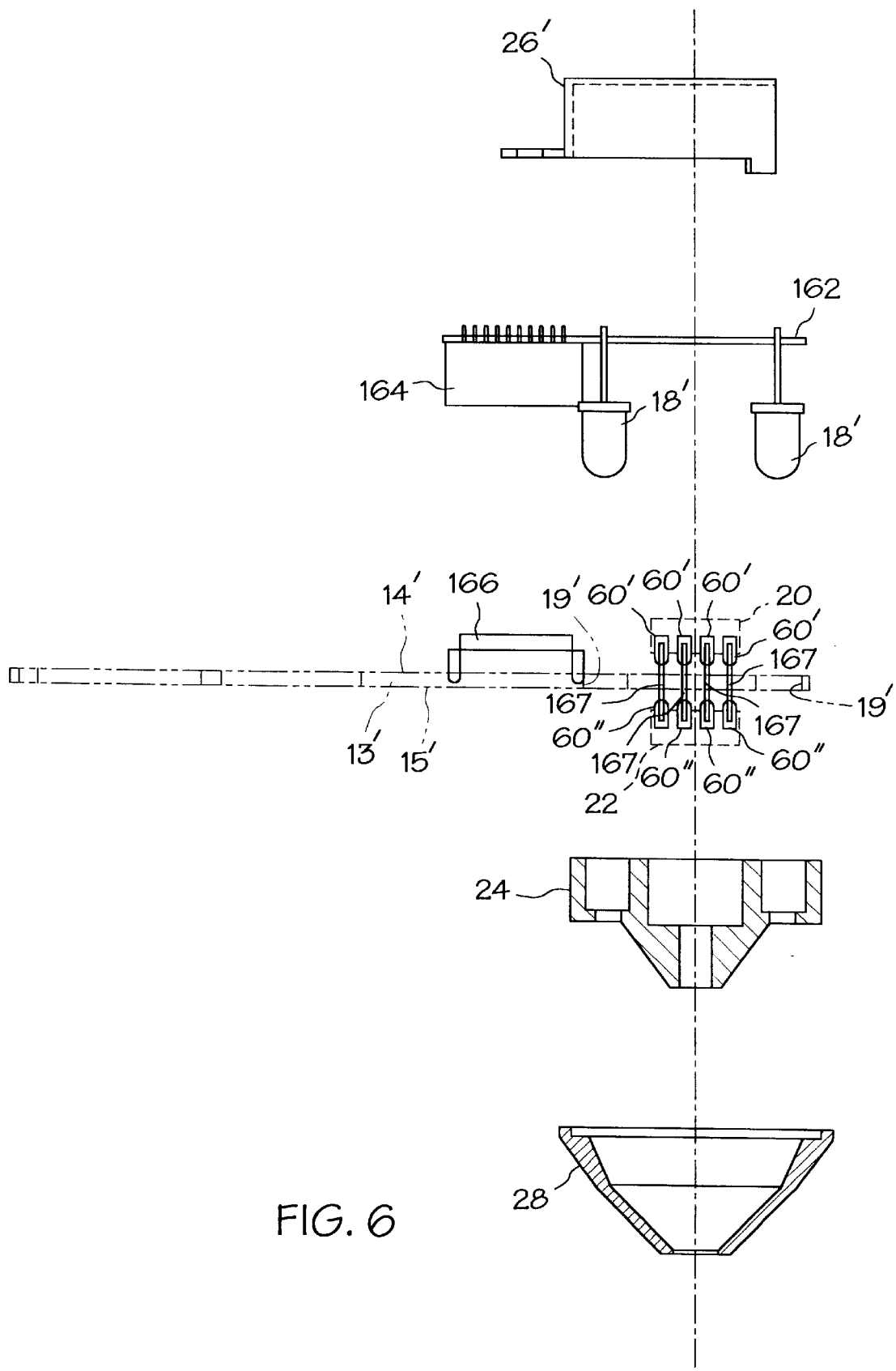
FIG. 6 is a cross-sectional, elevational, and exploded view of an embodiment of the color sensor and circuit board of the present invention.

As shown in FIG. 6, in an alternate embodiment of the invention, and to simplify mass-production of the device, the LEDs 18' can be mounted to a separate daughterboard 162 that, in turn, is mounted to the top surface 14' of the main circuit board 13' via mating connectors 164, 166. The main circuit board 13' will contain the electronics (described below) that drive the LEDs 18', and the electronic signals for driving the LEDs, produced by the main circuit board 13', will be passed to the daughterboard through the mating connectors 164, 166. When the daughterboard is mated to the main circuit board, the LEDs 18' will extend into the apertures 19' extending through the main circuit board 13'. An optical cap 26' designed to be fitted over the daughterboard 162 will be mounted to the top surface 14' of the main circuit board 13' and will act to reflect light emitted from the LEDs 18' to the reference photodetector 20 as described above. Likewise, the collar 24 and reflector cone 28 will be mounted to the bottom surface 15' of the main circuit board 13' and will act to direct light emitted from the LEDs 18' to the sample surface at approximately 45°, and to direct the diffuse component of the light reflected from the sample to the sample photodetector 22 as described above.

Figure 15:
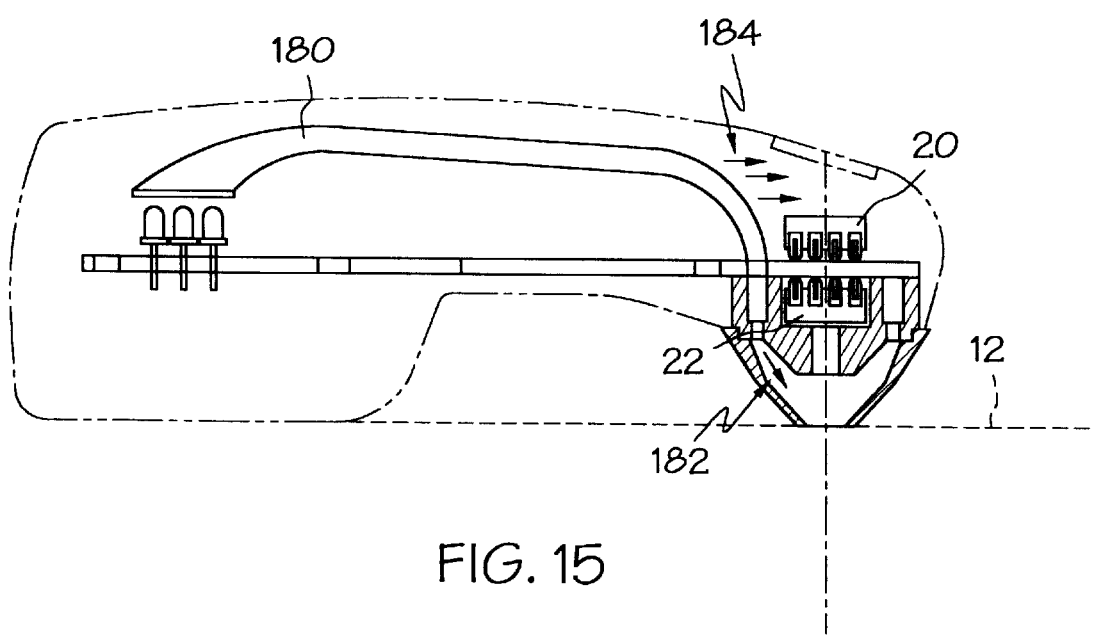
FIG. 15 is a cross-sectional, elevational view of another alternate embodiment of the present invention.

Those skilled in the art will appreciate that the light sources can be mounted or positioned in other ways; so long as a portion of the light emitted from the light source is transmitted or reflected through the emitter aperture 30 and another portion of the light emitted from the light source is emitted or reflected into the cavity 44 within the optical cap 26. For example, it is within the scope of the invention to mount each LED to the bottom surface 15 of the printed circuit board, extending completely within the emitter aperture 30, and to bore a hole through the printed circuit board 13 above the LED 18 such that the light emitted from the LED 18 will be transmitted through the hole and into the cavity 44 and will also be transmitted through the lower cylindrical channel 56 and into the cavity 53 as described above. In another example, as shown in FIG. 15, the LEDs can be clustered at any light-shielded point of circuit board; and when activated, an acrylic "light-pipe" 180 can be used similar to a fiber optic element, to direct a first fraction 182 of light waves to the sample surface 12 so that it is incident at 45°. Of course, the sample photodetector 22 will be in position to detect the diffuse component of the light reflected from the sample surface. Because the light-pipe 180 tends to bleed light waves radially therefrom, the reference photodetector 20 can be in any shielded position to receive a fraction 184 of light bleeding from the light-pipe 180.

It will also be apparent to those skilled in the art, that photodetectors for use with present invention can include photoconductive cells, photodiodes, photoresistors, photoswitches, phototransistors, phototubes, photovoltaic cells, light-to-frequency converters, or any other type of photosensor capable of converting light into an electrical signal. Such photodetectors can include integrated conversion of light to voltage with electronic amplification components; integrated conversion of light to digital frequency components; or integrated analog to digital conversion components.

Figure 4:
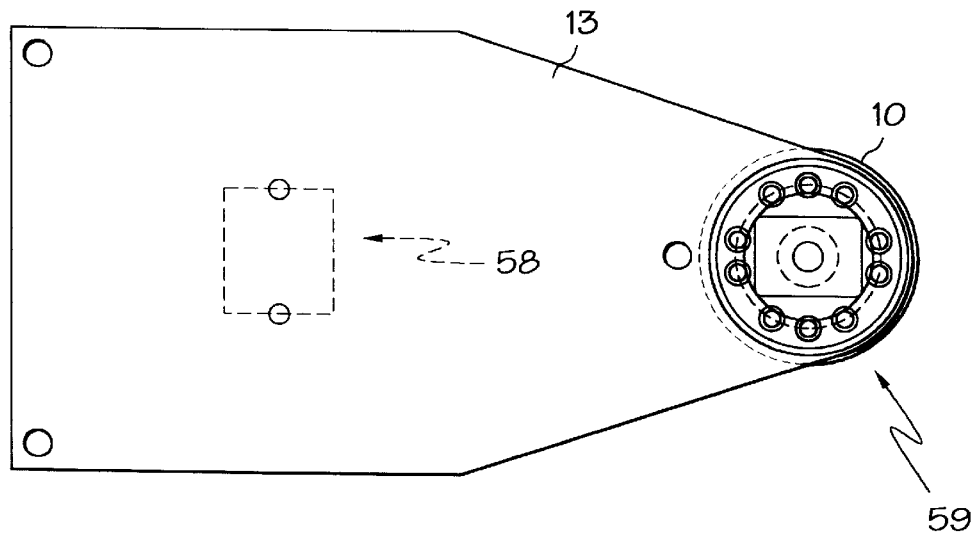
FIG. 4 is a top view of the color sensor of an embodiment of the present invention as incorporated into a circuit board.
Figure 5:
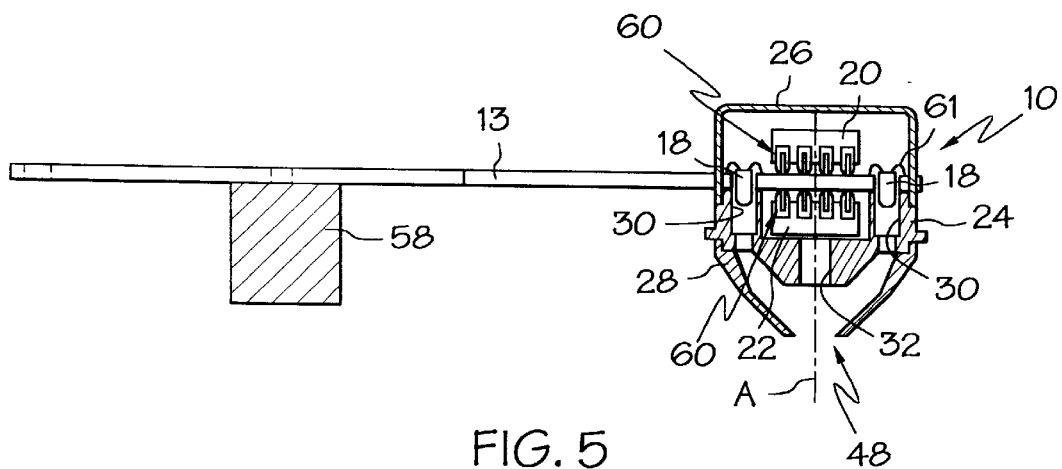
FIG. 5 is a cross-sectional, elevational view of the embodiment of FIG. 4.

As shown in FIGS. 4 and 5, the color sensor 10 is preferably mounted to the distal or pointed end 59 of a pointed printed circuit board 13. The circuitry for controlling the LEDs and photodetectors, and for transferring the measured signals to a host computer are also mounted to the printed circuit board 13. The reference photodetector 20 and the sample photodetector 22 are shown in FIG. 5 as off-the-shelf chip devices mounted to the printed circuit board 13 via pins 60. The LEDs are also off-the-shelf devices mounted to the printed circuit board 13 via leads 61. Suitable photodetectors for use with the present invention are OPT209PJ from Burr-Brown or TSL230A from Texas Instruments; and suitable LEDs for use with the present invention are NLPB-300A from Nichia, NSPB-300A from Nichia, NSPG-300A from Nichia, E166 from Gilway, E104 from Gilway, E198 from Gilway, E102 from Gilway, E472 from Gilway, BL-B4331E from America Bright, or HLMP-K640 from Hewlett Packard. Preferably, the LEDs are encapsulated so as to provide a lens integral with the LED. Optionally, a non-encapsulated light source can be utilized by incorporating a lens within the emitter aperture 30.

Figure 9:
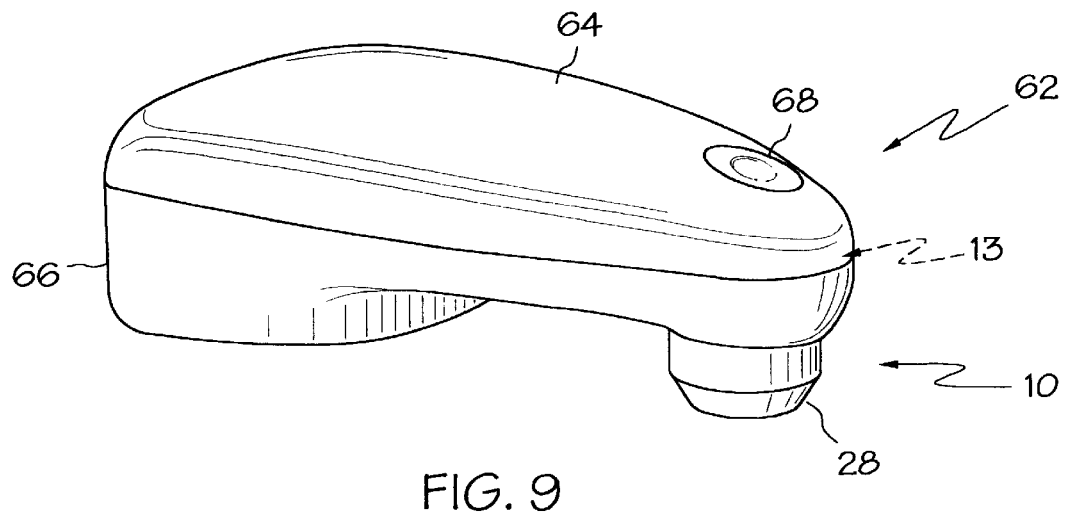
FIG. 9 is a perspective view of a hand-held "mouse" device incorporating the present invention.
Figure 10:
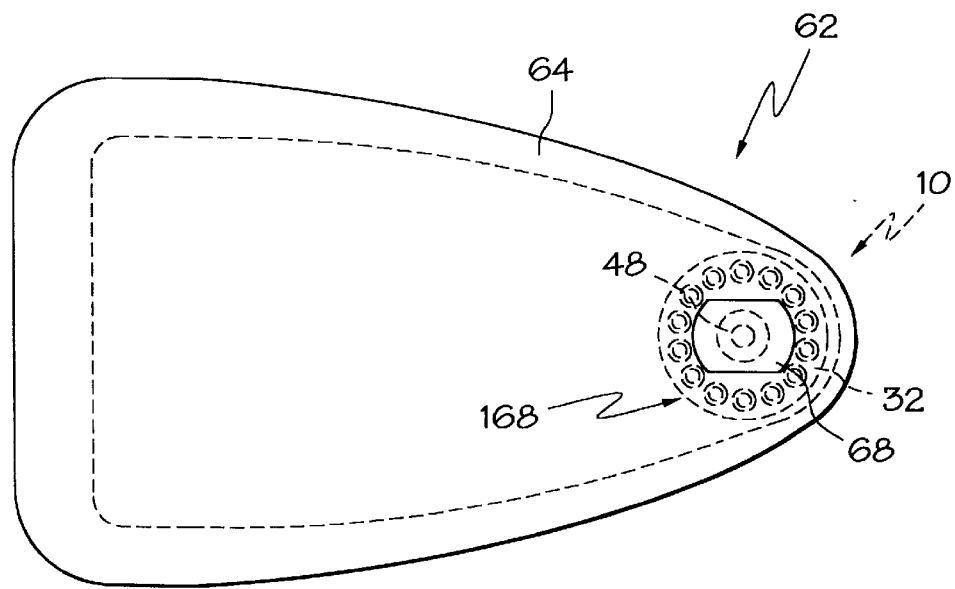
FIG. 10 is a top view of the hand-held "mouse" device of FIG. 9.
Figure 11:
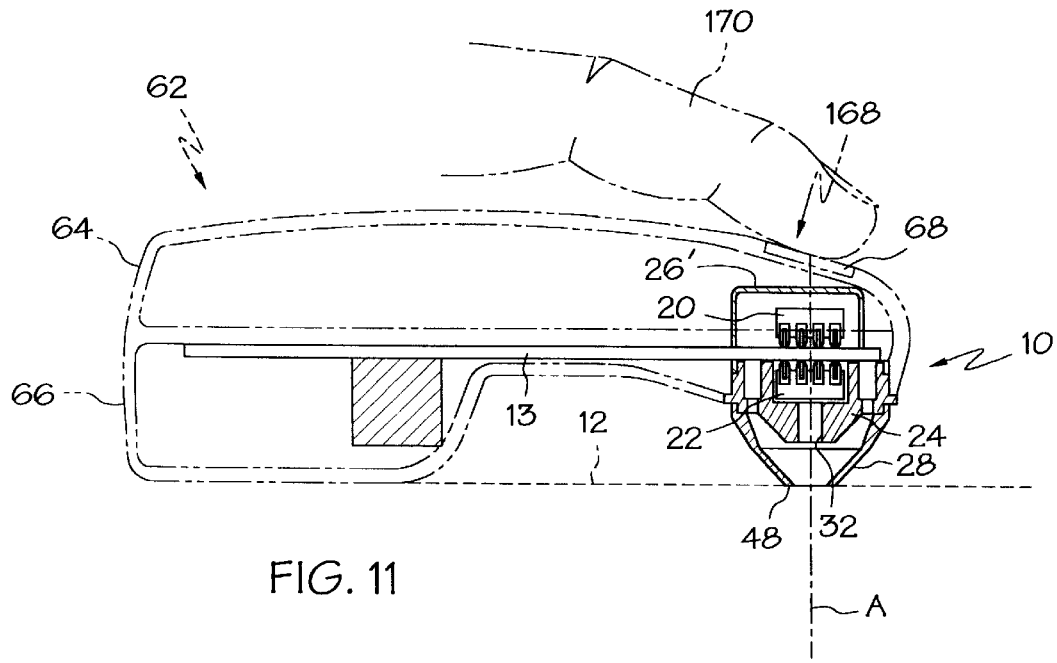
FIG. 11 is a cross-sectional, elevational view of the hand-held "mouse" device incorporating the present invention.

As shown in FIGS. 9–11, a shell 62, consisting of an upper shell piece 64 and a lower shell piece 66 is mounted around the printed circuit board 13 and color sensor 10 and is ergonomically shaped for gripping and manipulation by an operator's hand. The shell contains a pressure-activated switch 68 that is operatively coupled to the circuitry contained on the printed circuit board, such that the operator will be able to initiate a color measurement process by activating the switch. Preferably, the optical cap 26 is an integral part of the upper shell piece 64 and the collar 24 is an integral part of the lower shell piece 66. The reflector cone 28 is preferably an independent piece which is mounted to the shell 62 after mounting the upper shell piece 64 and lower shell piece 66 to the printed circuit board 13. The separate sensor parts, the upper shell piece 64, the lower shell piece 66 and the reflector cone 28 are all preferably made from an opaque black ABS plastic.

As shown in FIGS. 10 and 11, upper shell piece 64 has an area 168 for seating an index finger 170 of a human hand. Positioned in this area 168 is the switch 68, operatively coupled to the circuitry of the sensor such that pressure activation of the switch will activate the circuitry, and will thus initiate a calorimetric reading of the sample surface 12. The switch 68 is in axial alignment with the aperture 48 and with axis A of the collar 24, and in turn, is in alignment with the receiver aperture 32 of the collar. Accordingly, in the preferred embodiment, the user will be able to use the present invention to "point" with his or her index finger 170 to an area of the sample surface 12 that he or she wishes to take a colorimetric reading of the sample surface, and will then simply press the switch 68 using the same index finger.

Referring back to FIGS. 4 and 5, the measured signals received by the sensor 10 and preprocessed by the circuitry 13 are transmitted back to a host computer through a serial interface modular connector 58. The serial interface connector 58 can be made to support the RS-232 protocol, or can be configured to support the Apple Desktop Bus (ADB) protocol. Preferably, the serial interface connector 58 also supplies power to the sensor circuitry, as provided by the host computer.

The reference photodetector and the sample photodetector 20,22 are preferably identical devices and are preferably mounted back to back on the printed circuit board so that, not only will the photodetectors be substantially identical, they will share environmental characteristics, such as temperature, humidity, electrical noise, etc. Therefore, the photodetectors 20,22 will be substantially thermally matched so that temperature stabilization of the photodetectors is not required. This is because the temperature variances will cancel each other out in the reflectance calculation as described below. The collar 24 also provides thermal isolation between the LEDs 18 and the sample photodetector 22, thus preventing heat generated by the LEDs from interfering with the thermal matching between the reference and sample photodetectors. Furthermore, no gratings or filters are required because the use of LEDs of different wavelengths eliminates the need for such gratings or filters.

As shown in FIG. 6, each pin 60' of the reference photodetector 20 is optionally coupled to a corresponding pin 60" of the sample photodetector by a thermally conductive material 167. This material 167 enhances the matching of thermal characteristics between the reference photodetector 20 and the sample photodetector 22. If the corresponding pins 60', 60" are coupled to the same circuit connection, i.e., Vcc or ground, the material 167 may also be electrically conductive so as to facilitate the matching of electrical characteristics.

Those skilled in the art will appreciate that the sensor 10 need not be designed as mounted to a printed circuit board. A mounting plate or base can be provided in place of the printed circuit board; or the collar 24 or another component can be designed to house the LEDs and photodetectors within the sensor 10 in the arrangement required by the present invention.

Figure 7:
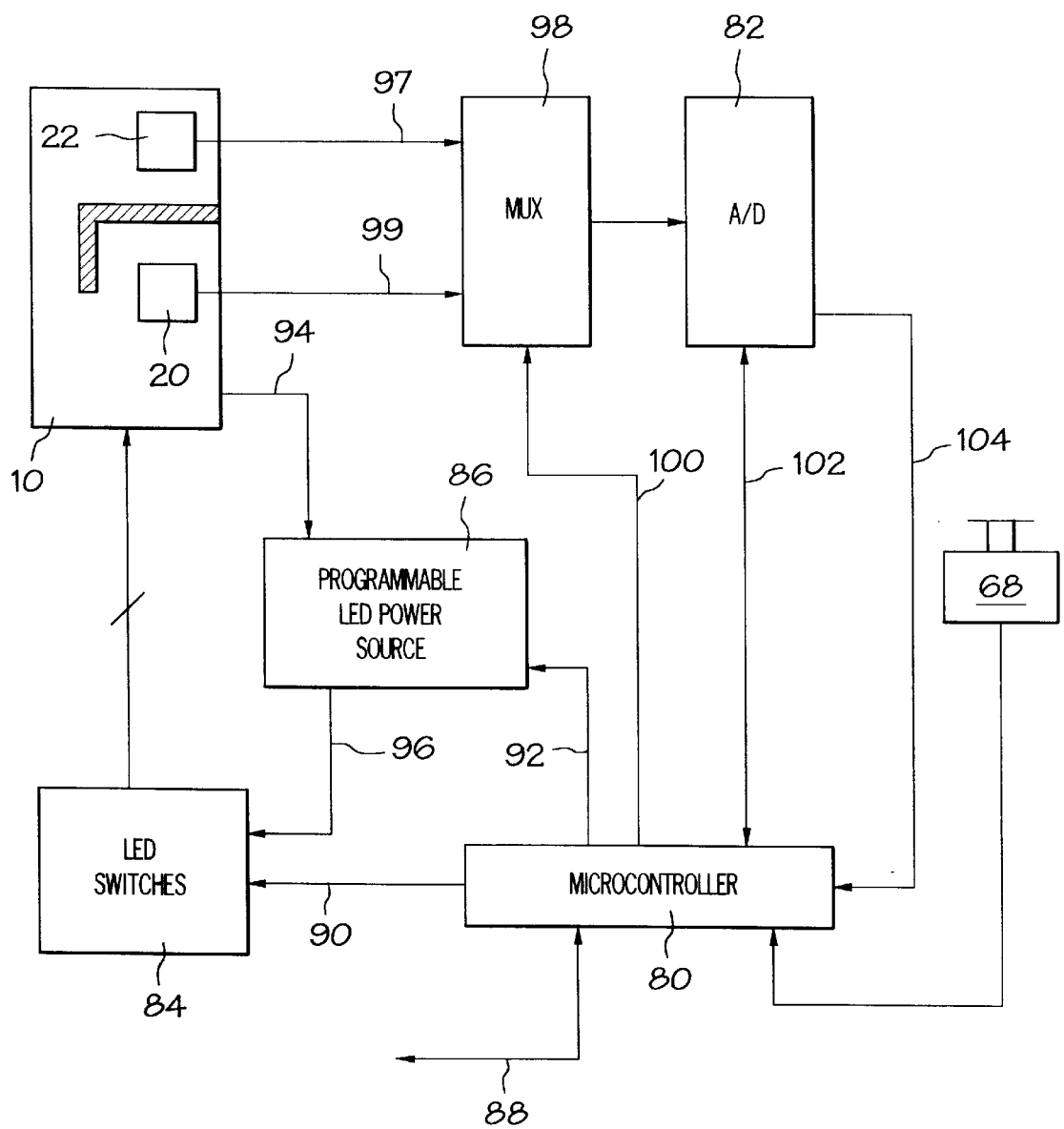
FIG. 7 is a schematic block diagram representation of circuitry for use with the present invention.

As shown in FIG. 7, circuitry for controlling the sensor 10 and preprocessing the measured signals taken from the sensor comprises a microcontroller 80, an analog to digital converter 82, a series of LED switches 84, and a programmable LED power source 86. The microcontroller 80 is operatively coupled to the switch 68. The microcontroller communicates with the serial interface modular connector 58 through a serial communications bus 88. The microcontroller 80 can control which of the LEDs 18 are activated through an LED select line 90 and can control the intensity of the activated LEDs through an LED level line 92 sent to the programmable LED power source 86. The programmable LED power source provides the LED power through an LED power line 96, and also includes an LED current sense input line 94 from a current detector housed within the sensor 10 as feedback to the programmable LED power source calculation. However, since the sensor 10 is by nature a dual-beam device, and emitter fluctuations are thereby cancelled during the process of measuring color, the LED current control circuit is not critical to the operation of the device, but can be used to optimize LED signal to desired levels.

A sample channel output line 97 is coupled between a multiplexer device 98 and the sample photodetector 22 housed within the sensor 10, and a reference channel output line 99 is coupled between the multiplexer device 98 and the reference photodetector 20 housed within the sensor 10. The microcontroller 80 is able to control which of the sample outlet channel line 97 or the reference channel output line 99 is sent to the analog to digital converter device 82 through a multiplexer control line 100, and the microcontroller 80 controls the operations of the analog to digital converter 82 through an AND control line 102. The digitized measurement from the sample photodetector 22 or the reference photodetector 20 output by the analog to digital converter 82 is sent back to the microcontroller 80 via a digitized value line 104. As will be apparent to one of ordinary skill in the art, the LED current sense line 94 can also be used to further correct the reference channel response for each individual LED against some expected response.

The color sensor 10 is operated as follows. To obtain reflectance readings of a sample surface, the reflector cone aperture 48 is first placed on the sample surface 12 and the switch 68 is activated. Upon activation of the switch 68, the microcontroller will take the digitized "dark" readings of the sample output channel 97 ($Is_d$) and of the reference output channel 99 ($Ir_d$) through the analog to digital converter device 82 (note that none of the LEDs 18 are activated). Next, the LED switches 84 are activated in sequence by the microcontroller 80, thus activating the LEDs 18 of the respective wavelengths in sequence. For each LED activated, the microcontroller takes the digitized readings of the sample output channel 97 ($Is_\lambda$) and of the reference output channel 99 ($Ir_\lambda$), where "λ" represents the peak wavelength of the particular LED activated. The raw, unscaled device reflectance $Ru_\lambda$ for each given LED of peak wavelength λ is then calculated using the following equation:

$$R_{u\lambda} = \frac{Is_\lambda - Is_d}{Ir_\lambda - Ir_d} \quad \text{(Equ. 1)}$$

Generally, the microcontroller 80 measures $Is_d$ and $Ir_d$ right after each other, but just before the $Is_\lambda$ and $Ir_\lambda$ measurements are made. This is an attempt to reduce the effect of photodetector offset drifts, which can be seen by the dark measurement. Similarly, $Is_\lambda$ and $Ir_\lambda$ are measured right after each other for a given LED, which is obviously an attempt to reduce photodetector gain drifts. Although it logically follows that for each LED, a measurement of $Is_d$ and $Ir_d$ should be made immediately prior to or following the particular $Is_\lambda$ and $Ir_\lambda$ measurement for that LED, a "shortcut" measurement cycle has been developed and verified through experimentation that requires only one $Is_d$ and $Ir_d$ measurement to be taken for all LEDs during the measurement cycle. The shortcut measurement cycle is as follows:

Measurement Cycle→$Is_d$, $Ir_d$, $Is_{\lambda 1}$, $Ir_{\lambda 1}$, $Is_{\lambda 2}$, $Ir_{\lambda 2}$ ... $Is_{\lambda N}$, $Ir_{\lambda N}$ where N is the number of LEDs illuminated during the cycle.

Additionally, it has also been found that a slight gain in precision can be obtained using the following measurement cycle:

Measurement Cycle→$Is_{d0}$, $Ir_{d0}$, $Ir_{\lambda 1}$, $Ir_{\lambda 1}$, $Is_{\lambda 2}$, $Ir_{\lambda 2}$ ... $Is_{\lambda N}$, $Ir_{\lambda N}$, $Is_{d1}$, $Ir_{d1}$ From this the resulting value of $Is_{d\lambda}$ and $Ir_{d\lambda}$ for each given LED of peak wavelength λ used in the dark correction scheme are obtained by interpolating from the measured values $Is_{d0}$, $Ir_{d0}$, $Is_{d1}$, and $Ir_{d1}$ as follows:

$$Is_{d\lambda} = ((N\, Is_{d0} + Is_{d1}) + (i-1)(Is_{d1} - Is_{d0}))/(N+1) \quad \text{(Equ. 2)}$$

for i=1 ... N
and similarly $$Ir_{d\lambda} = ((N\, Ir_{d0} + Ir_{d1}) + (i-1)(Ir_{d1} - Ir_{d0}))/(N+1) \quad \text{(Equ. 3)}$$

where λi corresponds to measurements made for the ith LED in the measurement cycle.

Preferably, at some point prior to measuring the reflectance of a colored sample surface, the color sensor should first be used to "calibrate" the photodetectors by activating the color sensor 10 over a black or non-reflecting calibration surface to obtain a "black" reflectance reading $R_{black}$, and then activating the color sensor 10 over a reflecting diffuse white surface to obtain a "white" reflectance reading $R_{white}$. The reflector cone aperture 48 is first placed on the "black" non-reflecting calibration surface, the switch 68 is pressed, and reflectance readings are made of the non-reflecting calibration surface. Then, the reflector cone aperture 48 is placed on the "white" reflecting calibration surface, the switch 68 is pressed, and reflectance readings are made of the reflecting calibration surface. These stored black and white calibration measurements $R_{black}$ and $R_{white}$ are then used to scale subsequent reflectance measurements $Ru_\lambda$, described above, as follows:

$$R_\lambda = (Ru_\lambda - R_{black})/(R_{white} - R_{black}) \times (S_w - S_b) + S_b \quad \text{(Equ. 4)}$$

where $R_\lambda$ is the normalized and bias corrected reflectance measurement for a given LED of peak wavelength λ; $S_w$ is a "white" scaling factor obtained from a standard reference device, such as a Gretag SPM100 laboratory grade spectrophotometer; and $S_b$ is a "black" scaling factor obtained from a standard reference device. It also follows that:

$$R' = ((Ru' - R'_{black})/(R'_{white} - R'_{black})) \times (S_w - S_b) + S_b \quad \text{(Equ. 5)}$$

where R' is a vector of size N representing the normalized and bias corrected reflectance color value of the sample just measured; Ru' is a vector of size N representing the raw, unscaled device reflectances of the sample just measured, $R'_{black}$ is a vector of size N representing the raw, unscaled device reflectances of a pre-measured "black" calibration tile; and $R'_{white}$ is a vector of size N representing the raw, unscaled device reflectances of a pre-measured white calibration tile.

In the above process, it is also within the scope of the invention to activate more than one LED at a time, and to determine the reflectance for the combined wavelengths of the illuminated LEDs. For example, to provide better CIE color matching functions and to quicken the sampling process, a combination of LEDs can be illuminated to provide the combined wavelengths for an entire RGB color wavelength band; thus requiring only three samples to be taken and calculated—i.e., one for all LEDs making up the RED band, one for all LEDS making up the GREEN band, and one for all LEDs making up the BLUE band. Additionally, multiple LEDs of the same wavelength may be activated simultaneously to increase the apparent brightness associated with a particular wavelength band.

As discussed above, it is within the scope of the invention to utilize a light-to-frequency converter device, such as a TSL230 from Texas Instruments, as a photodetector. The light-to-frequency converter device emits a frequency signal that corresponds to the brightness of the light detected by the device. Accordingly, use of a light-to-frequency converter device may eliminate the need for analog-to-digital converter devices in the present invention, because the host computer or microcontroller will be able to calculate the reflectance based upon the frequency of the signal transmitted by the light-to-frequency device.

An on-board programmable memory may optionally be included in the circuitry to contain hardware setup and calibration information; and accommodation of a liquid crystal display may also be included to provide a user read-out. Other enhancements can include an internal battery for wireless operation.

The present embodiment for calorimetric operation utilizes ten LEDs of different wavelengths. Preferably, the peak wavelengths of the ten LEDs utilized are 430, 450, 470, 525, 558, 565, 585, 594, 610, and 635 nanometers respectively. It is noted that although the peak wavelengths are indicated, each LED transmits wavelengths of a particular bandwidth, which typically ranges from ten to one-hundred nanometers wide.

It should be apparent to one of ordinary skill in the art that additional or fewer LEDs may be utilized in the present invention, depending upon the accuracy and repeatability requirements of the sensor. For example, a sensor utilizing three or six LEDs will have lesser accuracy or repeatability than in the ten LED embodiment and a sensor utilizing sixteen LEDs will have greater accuracy and repeatability than the ten LED embodiment. Preferably, if a three LED embodiment is utilized, the peak wavelengths of the three LEDs are 450, 555, and 610 nanometers respectively; if a six LED embodiment is utilized, the peak wavelengths of the six LEDs are 450, 470, 512, 555, 580, and 610 nanometers respectively; and if a sixteen LED embodiment is utilized, the peak wavelengths of the sixteen LEDs are 430, 450, 470, 489, 512, 525, 558, 565, 574, 585, 594, 605, 610, 620, 635, and 660 nanometers respectively.

Although it is within the scope of the invention to utilize the three LED embodiment (i.e., 450, 555, and 610 nanometers respectively), there are several practical advantages for using more than three spectrally unique LEDs or channels for collecting data. First, using more than three spectral shapes makes it easier to span the space defined by the CIE color matching functions, since each additional channel provides an additional degree of freedom with which to compute tristimulus values.

Second, in practice, it is difficult to cover the space defined by the color matching functions for one particular illuminant with a combination of only three LEDs. This is due to the fact that there is a limited number of LED spectral shapes commercially and physically available, and the LED power spectral distributions vary significantly between LEDs from a single lot. Therefore, by using more than three LEDs the instrument will not be as sensitive to known variations in the LEDs (due to redundancy). In addition, combining LEDs will provide effective shapes that are different than those provided by single LEDs. This can facilitate in matching the multi-peak CIE color matching functions.

Finally, using more than three channels will allow the device to provide calorimetric information for the sample under measure for multiple illuminants without obtaining the entire spectral reflectance of the sample. This capability results in an instrument with significant flexibility over a three channel device.

Once the corrected, reflectance ratio vector R' of the sample is determined as described above, this ratio vector R' is then converted into a usable color measurement value t (for example, the color measurement value t can be the CIE XYZ tristimulus value for the sample) through a linear or a non-linear operation. To execute this conversion, a mathematical profile of the sensor 10, which obtained the measurement, must first be determined. This is because the conversion from the reflectance ratio vector R' to the color measurement value t depends upon the unique spectral characteristics of the sensor components used to obtain the reflectance ratio vector R'.

The mathematical profile of the sensor 10 is based upon the following matrix/vector equation:

$$R' = S^T D r + b \qquad \text{(Equ. 6)}$$

where (assuming M is the number of LEDs 18 and N is the number of wavelengths to be sampled in the visible spectrum) R' is an M×1 vector of the recorded reflectance ratios; $S^T$ is an M×N matrix representing the spectral power distributions of the M spectrally unique LEDs 18; D is an N×N diagonal matrix representing the spectral sensitivity of the sample photodetector; b is an M×1 bias vector; and r is an N×1 vector representing the actual spectral reflectance of the sample. The mathematical profile of the device is determined by finding $S^T$, D, and b. These values are found by taking measurements of samples having known spectral reflectances r, using the sensor 10. In simple terms, the determination of the mathematical sensor profile is based on the spectral sensitivity of the sample photodetector, the spectral power distributions of the LEDs 18, and the reflectance of several known samples.

The spectral sensitivity D of the sample photodetector is available from the photodetector's manufacturer. Provided a quality photodetector is used, the sensitivity should be the same, within an acceptable range, over all detectors. At the time of the present invention, LED manufacturers are not able to ensure the exact spectral shape and peak wavelength across a particular batch of LEDs. For this reason, it is necessary to measure the spectral power distribution $S^T$ of each LED with a spectraradiometer. But because, the spectraradiometer provides only the relative shape of the distribution, the absolute power of the LEDs and the bias vector b are determined by performing a measurement with the sensor 10 on each of two spectrally known samples having known reflectances $r_1$ and $r_2$. Typically, black and white samples are used. These measurements provide M sets of 2 equations to solve for the two unknowns ($S^T$ and b), where we already have each row of $S^T$ to within a constant:

$$R_1' = S^T D r_1 + b \qquad \text{(Equ. 7a)}$$

$$R_2' = S^T D r_2 + b \qquad \text{(Equ. 7b)}$$

Once the sensor is profiled, i.e., once $S^T$, D and b are found, an accurate estimate of the actual spectral reflectance r of the sample can be obtained. The CIE XYZ tristimulus value t for the sample under illuminant L can be denoted by the vector/matrix equation:

$$t = A^T L r \qquad \text{(Equ. 8)}$$

where L is an N×N diagonal matrix containing the illuminant spectral power distribution and the columns of the N×3 matrix A contain the CIE XYZ color matching functions. The determination or approximation of t according to Equ. 8 will be apparent to one of ordinary skill in the art. Mathematically the problem of transforming from the ratios to a descriptor like t can be described as:

$$\min_G E\{\|F(t) - F(G(c))\|\} \qquad \text{(Equ. 9)}$$

where {} is the expectation operation over the system noise and reflectance spectra of interest, F is a function which transforms from the color space containing t to a perceptually uniform color space (i.e., accounts for the sensitivity of the human visual system), and G is the function approximating t (G(c)≈t). Accordingly, G is the function to be found. Depending upon the application, it may be desirable to select G as either a linear or non-linear function.

For applications in which a spectrally widely varying set of samples is measured, a linear transformation will be more robust than non-linear transformations. Typically, the function F will be of a form which makes an analytical solution to the above optimization problem difficult. In this case, the transformation G can be found by a two step process. In the first step, an initial estimate for G is obtained analytically which minimizes the error in the CIE XYZ space (i.e., the function F is ignored). This solution is easily computed using simple matrix algebra. In the second step, this estimate is used as a starting point for a numerical optimization algorithm which minimizes the above non-linear problem. Any standard non-linear optimization algorithm will be sufficient for this task.

The expectation operator in the above optimization problem is taken over a set (or ensemble) of reflectance spectra. The above approach requires some representative reflectance samples which the sensor may be used to measure. From these samples, a reflectance correlation matrix is constructed and used in the first analytical step (when the function F is ignored). Specifically, the analytical solution is given by:

$$G = A^T K_r S [S^T K_r S]^{-1} \quad \text{(Equ. 10)}$$

where $K_r = E\{rr^T\}$ is the reflectance correlation matrix which is estimated by:

$$K_r = 1/N_R \sum_{i \in R} r_i r_i^T \quad \text{(Equ. 11)}$$

where R is some ensemble of $N_R$ reflectance spectra. The numerical step is then performed over each sample in R. The conditioning of the transformation matrix can be set as an optimization constraint. The amount of conditioning or regularization should be a function of the system noise thereby producing a transformation which gives good repeatability.

Alternatively the function F can be locally linearized for each sample in the ensemble R. This linearization provides a means to obtain analytically a solution which may be perceptually acceptable, and allow the incorporation of the system noise for good repeatability.

Finally, for the spectral case, the optimization problem becomes:

$$\min_G E\{\|r - G(c)\|\} \quad \text{(Equ. 12)}$$

for which the analytical solution is given by:

$$G = K_r S [S^T K_r S]^{-1} \quad \text{(Equ. 13)}$$

Depending upon the system noise and the LEDs it may be necessary to perform a pseudo-inverse operation for computing the above inverse. The pseudo-inverse operation may also be needed in the calorimetric case. The pseudo-inverse can be computed by dropping numerically insignificant singular values in the matrix $S^T K_r S$.

Figure 14:
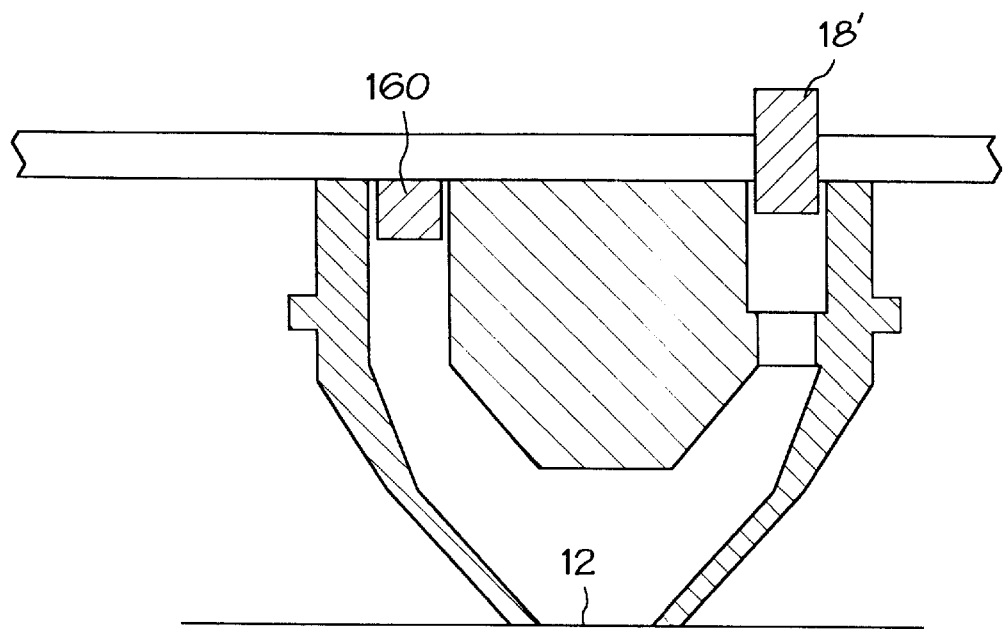
FIG. 14 is a cross-sectional, elevational view of another alternate embodiment of the present invention.

As shown in FIG. 14, the present invention, by installing a photodetector 160 in place of an LED, can also be used as a gloss meter. The photodetector 160 would have to replace a first LED which is positioned 180° away from a second LED 18" with respect to axis A. The photodetector would thus be able to detect the specular component of the light waves transmitted from the second LED and reflected off the sample.

It should also be apparent to one of ordinary skill in the art that LEDs 18 having wavelengths in the non-visible spectrum can be utilized for various purposes. For example, utilizing LEDs in the infrared spectrum will allow the sensor to measure the infrared reflectivity of a sample surface. In a related application, the infrared LEDs can also be used to transmit data to a host computer through the reflector cone's aperture 48; thus eliminating the need for the serial interface connector 58.

The present invention can also be used to measure the radiance of a given sample that is self luminous, i.e., a CRT display screen. This application does not need to utilize the LEDs.

Figure 8:
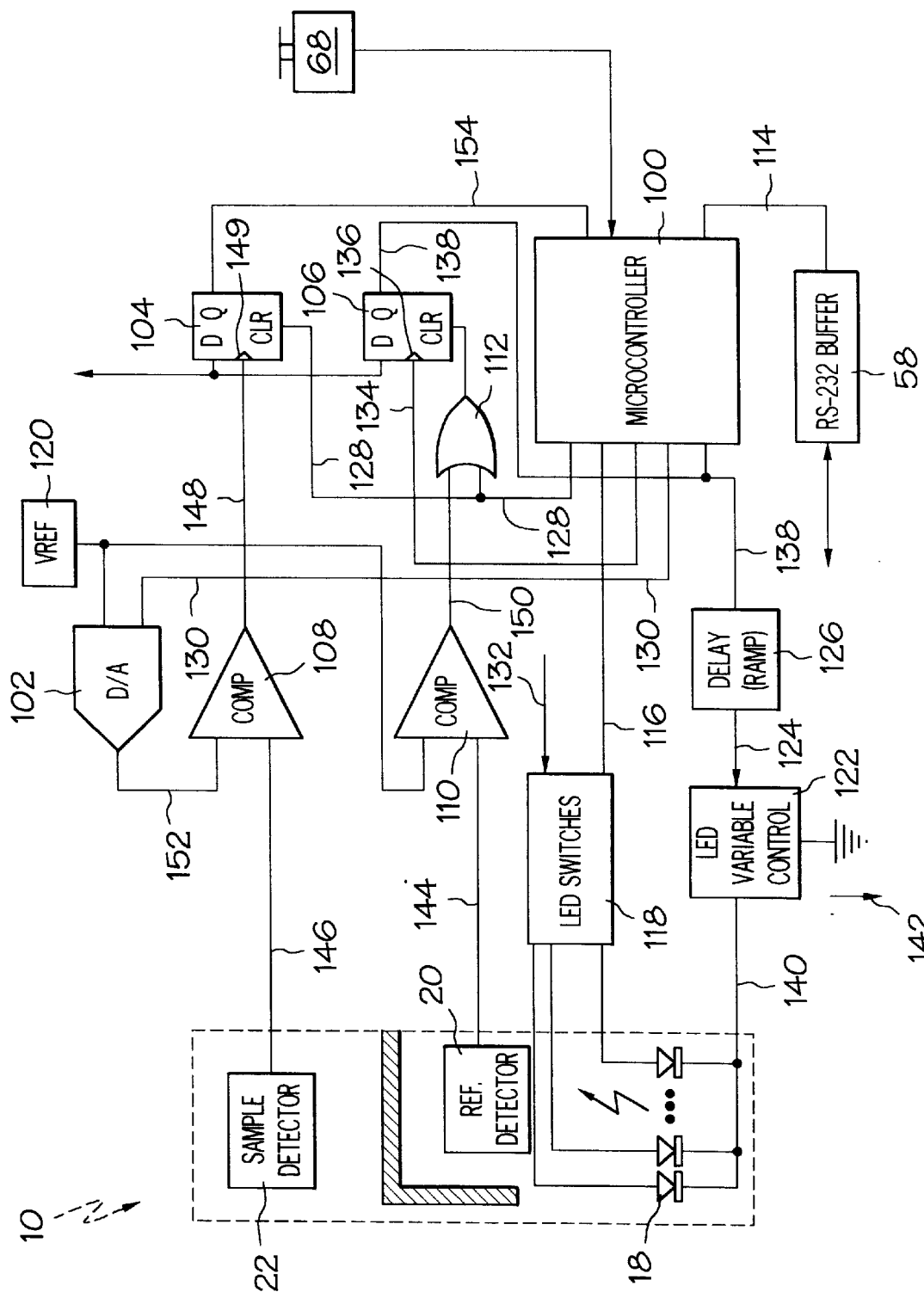
FIG. 8 is a schematic block diagram representation of alternate circuitry for use with the present invention.

As shown in FIG. 8, an alternate circuit for the present invention utilizes a successive approximation technique to perform measurement of spectral reflectances from the dual beam sensor 10. The circuitry for performing the successive approximation measurement comprises a microcontroller 100, a digital to analog converter 102, a D latch 104, another D latch 106, a sample channel voltage comparator device 108, a reference channel voltage comparator device 110, and an OR gate 112. The microcontroller is operatively coupled to the switch 68. The microcontroller 100 communicates with the serial interface modular connector 58 through a communications bus 114. The microcontroller can control which of the LEDs 18 are activated through an LED select line 116, which indicates which of the LED switches 118 are to be activated or inactivated. The approximation circuit also utilizes a voltage reference 120, which is a fixed stable voltage reference used by the digital to analog converter 102 and the reference channel voltage comparator device 110. The approximation circuit also utilizes an LED variable control device 122, which provides variable resistance used to gate the amount of current allowed to flow from the LED's current drain. This device is fed by an LED gate signal 124 sent from a delay ramp circuit 126 that generates a voltage ramp beginning at a low voltage level, and over time, becomes higher in a linear fashion.

The approximation circuit is initialized as follows: Initially, upon activated by the switch 68, the microcontroller activates a clear line 128 which clears both D latches 104,106; the microcontroller transmits to the digital to analog converter 102 a 0.5 full scale code through a D/A control line 130; and the internal LED select variable i (which indicates the particular LED switch to be activated) is initialized to zero (no LED selected).

The reflectivity measurement process for a given LED i is conducted as follows: The microcontroller 100 will first select LED i through the LED select line 116 sent to the LED switches 118. LED power 132 is applied to the LED i, but the LED i does not yet activate because the LED variable control device 122 is "off." Next, the microcontroller 100 activates a "start" line 134, which is coupled to the clock input 136 of the D latch 106. Accordingly, the Q output 138 of the D latch 106 ("LED on") becomes activated as the "start" signal ripples through the D latch 106. This "LED on" signal 138 is sent to the delay ramp circuit 126, which in turn begins applying the linearly increasing "LED gate" signal 124 to the LED variable control device 122. The LED variable control device 122, now activated, allows current to flow from the LED power source 132 through the previously selected LED switch 118 through the corresponding LED 18 and LED cathode 140 and into an "LED current drain" 142. Of course, since current is flowing through the LED 18, the LED now emits light at its predetermined wavelength; however, the brightness depends upon the linearly increasing "LED gate" signal 124.

The reference photodetector 20, as discussed above, receives light from the activated LED 18 and transmits a signal indicative of the measured light to the voltage comparator 108 over a reference channel output line 144. Likewise, the sample photodetector 22 receives light reflected from the color sample, as discussed above, and transmits a signal indicative of the detection of this light to the voltage comparator circuit 108 over a sample channel output line 146. As the LED gate signal 124 increases, intensity of light from the LED 18 increases until either the sample output voltage comparator 108 or the reference output voltage comparator 110 is activated. The sample channel voltage comparator 106 will be activated if the voltage on the sample channel output line 146 is greater than the analog output 152 from the digital to analog comparator 102, and the reference channel voltage comparator 104 will be activated if the reference channel output line 144 voltage is larger than the voltage reference 120.

If the sample output voltage comparator 108 is activated, it activates the "X>Y" line 148, which is coupled to the clock input 149 of the D latch 104. Therefore, upon the "X>Y" 148 signal being activated by the sample channel voltage comparator, the D latch 104 will correspondingly notify the microcontroller 100 over the "X>Y (held)" line 154. At this time, the microcontroller 100 will determine if the granularity (resolution) of the D/A setting has been reached and, if so, this measurement is reported to the host computer through the RS232 serial link 58, and the measurement is complete. If the microcontroller 100 determines that the granularity of D/A setting has not been reached, the digital to analog signal is increased over the digital to analog control line 130, the microcontroller sets the "clear line" 128 clearing both D latches 104,106 and restarts the above measurement. process beginning with activating the "start" line 134.

Alternatively, if the reference channel voltage comparator 110 is activated, this indicates that the reference channel output 144 voltage is larger than the voltage reference 120. Activation of the reference channel comparator 108 thus causes the D latch 106 to be cleared. The microcontroller 100 will sense this, through a "fault" signal, and will decrease the D/A control signal 130 to the digital to analog converter 102, and will again proceed with the above measurement process starting by activating the "start line" 134.

The above successive approximation circuit can be used to measure the sample channel output 146 with respect to the reference channel output 144. This method uses the digital to analog (D/A) converter 102 to set a threshold level 152 against which the sample channel output 146 is compared. If the threshold level is too low, it is increased; if it is too high, it is decreased. The threshold value being sought is that which matches the sample channel output 146 at the closest possible instant to when the reference channel output 144 matches the stable voltage reference 120. This method of "hunting" for the appropriate threshold is iterative, and when certain optimizations, such as a binary tree search algorithm, are employed, it can be relatively quick. When the final threshold is discerned, the digital representation corresponding to the sample channel is known. Since the stable voltage reference 120 is both used to generate the output voltage 152 of the D/A 102, as well as in the comparison of the reference photodiode channel output 144, the act of comparing the sample photodiode channel output 146 to the D/A output voltage 152 is effectively the same as the direct comparison of the sample photodiode channel output 146 with the reference photodiode channel. Furthermore, since the output voltage 152 of the D/A 102 is defined by the following relationship:

D/A output=voltage reference×(digital setting/full scale digital value)

and since at the moment when the comparison is valid, the reference photodiode channel output 144 is nearly equivalent to the voltage reference 120 while the sample photodiode channel output 146 is nearly equivalent to the D/A output, the above relation becomes:

(sample chan./ref. chan.)=(digital setting/full scale digital value)

Therefore, the act of finding the digital setting corresponding to the appropriate threshold is the same as finding the value of sample channel divided by the reference channel.

Of course, the above circuit is equally valid when a means to scale the sample and/or reference channels by known quantities is used. In addition, assuming linearity of the output of the combination of the "delay (ramp)" 126 and "LED variable control" 122 circuits, the binary tree search algorithm can even be further improved by noting the time discrepancy between the triggering of the sample channel comparison and the triggering of the reference channel comparison, and scaling next resulting "expected" threshold setting accordingly. Finally, it is also valid that the reference channel output 144 be used as the reference voltage by which the D/A output voltage 152 is generated; this is the most direct means of calculating the desired value of sample channel output divided by reference channel output.

Figure 12A:
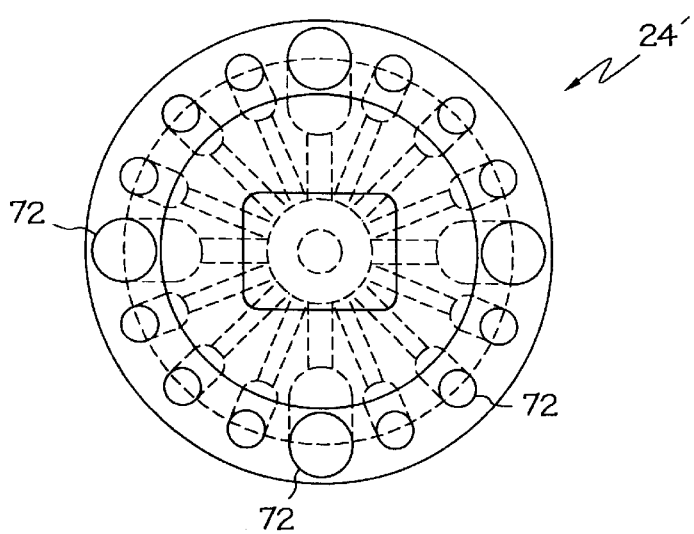
FIGS. 12a–c respectively show a top view, one cross-sectional elevational view, and another cross-sectional elevational view of an alternate embodiment of the annular collar component of the present invention.
Figure 12B:
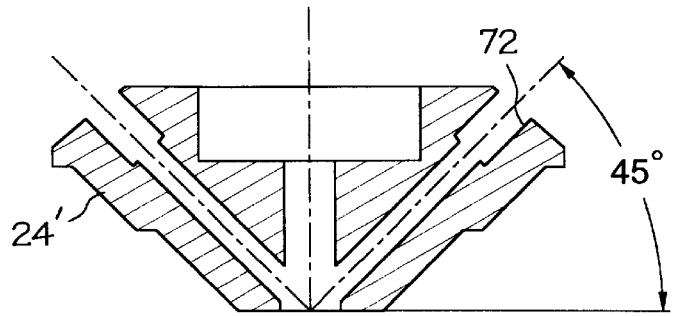
Figure 12C:
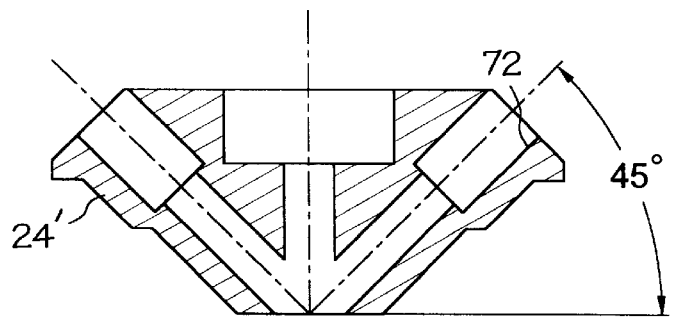

As shown in FIGS. 12a–12c, an alternate embodiment of the annular collar 24' has a plurality of emitter apertures 72 angled at a 45° angle towards the axis A, eliminating the need for the 22.5° conical reflective surface within a reflector cone, and eliminates the need for the reflector cone altogether. It is noted that the different sizes depicted for the emitter apertures 72 corresponds to different sizes of LEDs used.

Figure 13:
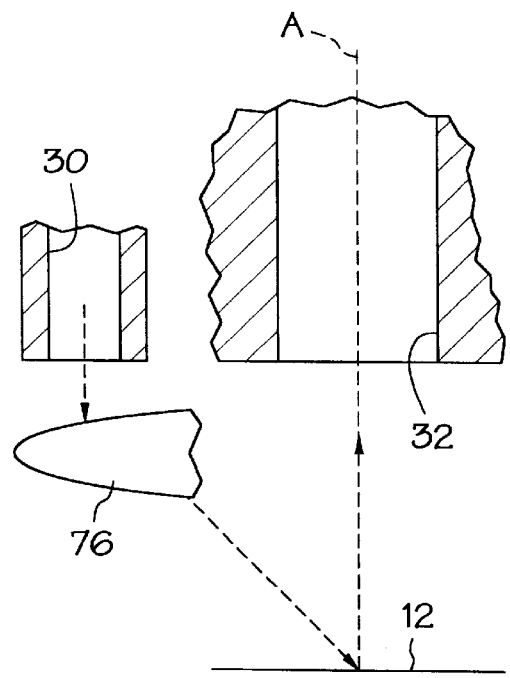
FIG. 13 is a cross-sectional, elevational view of an alternate embodiment of the color sensor of the present invention.

As shown in FIG. 13, an alternate embodiment of the invention includes an optical lens 76 in place of the reflective surfaces of the reflector cone. The optical lens acts to bend the lightwaves emitted from the emitter apertures 30 to a 45° angle towards the axis A.

It is also within the scope of certain aspects of the present invention to provide a "low-end" color sensor that does not utilize the reference photodetector 20, yet may utilize any or all of the novel elements described above for use with a hand-held, single-beam color sensor. Referring to FIG. 7, an important element in such a single-beam color sensor would be the LED current sense input line 94. It would also be beneficial in such an embodiment to inject the current sense signals into the sample photodetector 22 and an associated amplification circuit (whether internal or external to the sample photodetector) to provide advanced gain and offset correction.

As mentioned above, alternate embodiments of the invention as shown in FIGS. 16 and 17 may be better suited for remote color sensing of a sample surface, such as a patient's skin. As shown in FIG. 16, a reflector cone 28" includes a conical reflector surface 52" that is angled with respect to the axes B of the emitter apertures 30" at a 10° angle. Light emitted through the emitter apertures 30" and reflected from the conical reflective surface 52" will contact the sample surface 12 at an angle of 20°. Therefore the embodiment as shown in FIG. 16 will have a 20°/0° geometry. As shown in FIG. 17, a collar 24''' includes a radially outwardly extending, and substantially conical reflective surface 190, which intersects axes B such that light emitted through the emitter apertures 30''' will be reflected towards a curved, inner reflective surface 192 of a reflector cone 28'''. The light reflected from the inner reflective surface 192 towards the sample surface 12 will thus be substantially diffuse. Therefore, the embodiment as shown in FIG. 17 will have a modified-diffuse/0° geometry.

Having described the invention in detail and by reference to preferred embodiments thereof, it will be apparent that modifications and variations are possible without departing from the scope of the invention defined in the appended claims.

What is claimed is:

1. A method for measuring color of a sample surface, comprising the steps of:
   (a) activating at least one light source, said light source emitting light of a wavelength band;
   (b) directing a first portion of said light emitted by said light source to a reference photodetector;
   (c) directing a second portion of said light emitted by said light source to the sample surface;
   (d) directing light reflected from the sample surface to a sample photodetector;
   (e) calculating a reflectance of the emitted light based upon output readings of the sample photodetector in step (d) and output readings of the reference photodetector in step (b); and
   (f) repeating steps (a) through (e) for at least three light sources, each emitting light of substantially different wavelength bands.

2. The method of claim 1, wherein a combination of light sources, each emitting light of different wavelength bands, are activated simultaneously in step (a).

3. The method of claim 1, further comprising the steps of:
   (f) obtaining a reading from the sample photodetector when none of the light sources are illuminated; and
   (g) obtaining a reading from the reference photodetector when none of the light sources are illuminated;
   wherein step (e) involves the step of calculating a reflectance for said light source based upon a ratio of a difference of output readings of the sample photodetector in step (d) and output readings of the sample photodetector in step (f) verses a difference of output readings of the reference photodetector in step (b) and output readings of the reference photodetector in step (g).

4. The method of claim 3, further comprising the steps of:
   (h) activating the light source of step (a);
   (i) directing a first portion of light emitted by the light source to a reference photodetector;
   (j) directing a second portion of light emitted by the light source to a substantially non-reflective calibration surface;
   (k) calculating a black calibration reflectance. for the light source based upon output readings of the sample photodetector in step (j) and output readings of the reference photodetector in step (i);
   (l) activating the light source of step (a);
   (m) directing a portion of light emitted by the light source to a reference photodetector;
   (n) directing a second portion of light emitted by the light source to a substantially white calibration surface;
   (o) calculating a white calibration reflectance for the light source based upon output readings of the sample photodetector in step (n) and the output readings of the reference photodetector in step (m); and
   (p) calculating a normalized and bias corrected reflectance for the light source using the reflectance calculated in step (e), the black calibration reflectance calculated in step (k) and the white calibration reflectance calculated in step (o).

5. The method of claim 1, wherein said wavelength bands are within a visible spectrum.

6. The method of claim 1, wherein said reference photodetector and said sample photodetector are positioned within close proximity of one another so as to share environmental characteristics.

7. The method of claim 6, wherein said reference photodetector and said sample photodetector are thermally insulated from said light sources.

8. The method of claim 1, wherein said steps (a) through (e) are performed with a hand-held mouse device, which includes:
   said light sources;
   said reference photodetector;
   said sample photodetector;
   a first optical element adapted to direct a first portion of the light emitted by each of said light sources to said reference photodetector;
   a second optical element adapted to direct a second portion of the light emitted by each of said light sources to the sample; and
   a third optical element adapted to direct a portion of light reflected off of the sample to said sample photodetector.

9. The method of claim 1, wherein step (e) includes the step of accounting for the sensitivity of the reference photodetector and the spectral power distribution of the light source.

10. The method of claim 1, further comprising the step of profiling the characteristics of the reference photodetector and the light source by performing steps (a) through (f) on at least two samples having known reflectances.

11. The method of claim 1, further comprising the step of transforming the reflectance into a CIE XYZ tristimulus value for the sample, wherein the transformation accounts for the sensitivity of the human visual system.

* * * * *